Figure 1A:
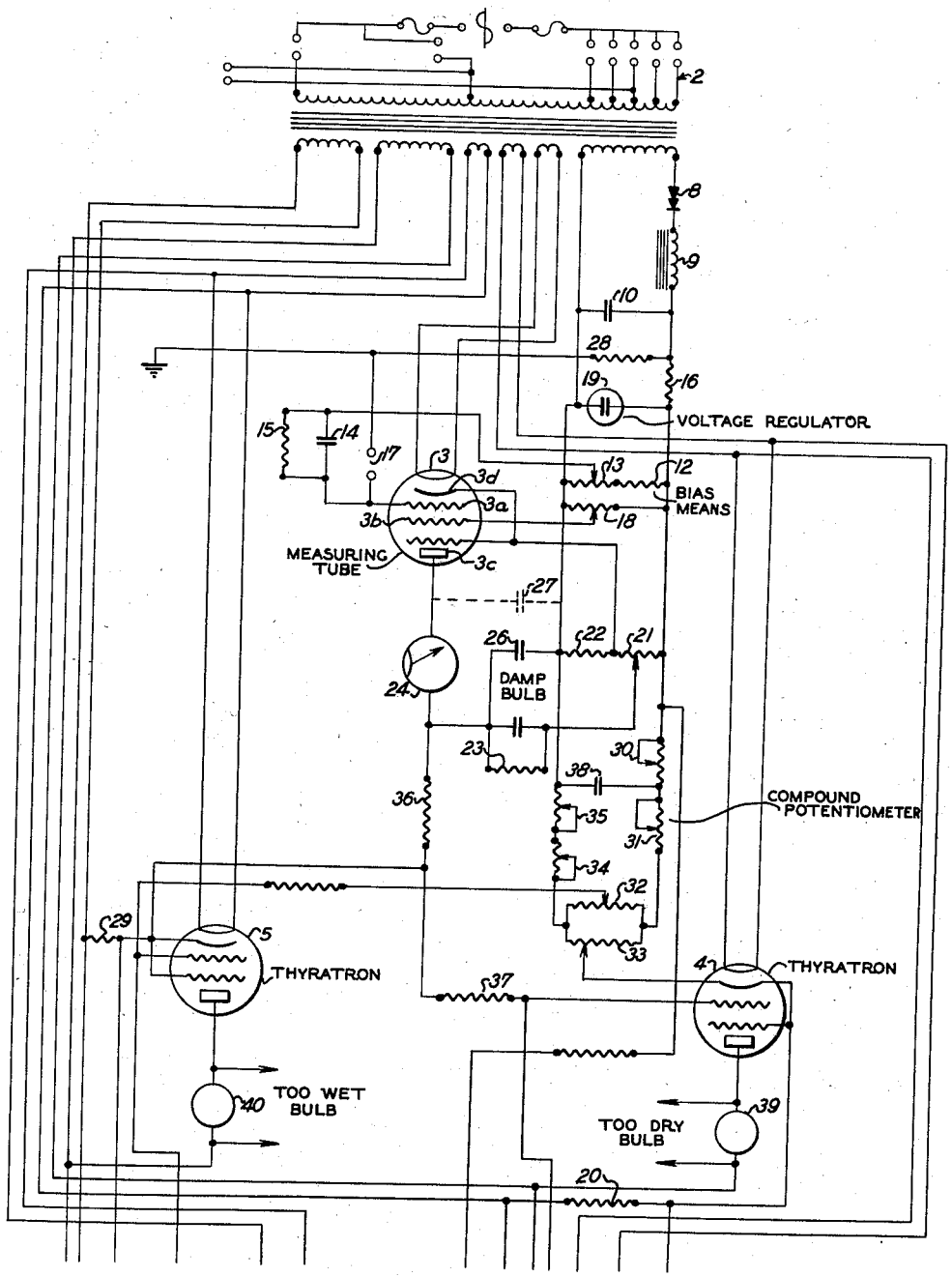

2,862,304

APPARATUS FOR DEFINING THE PERCENTAGE OF MOISTURE CONTAINED IN ANY MATERIAL AND FOR CHECKING OR CONTROLLING MACHINES TREATING MOIST MATERIAL

Henri Eicken, dit Estienne, Lyons, France

Application July 6, 1953, Serial No. 366,242

Claims priority, application France July 8, 1952

1 Claim. (Cl. 34—52)

The present invention relates to hygrometric devices, and more particularly to devices of this nature suitable for detecting throughout a wide range of values the percentage of moisture contained in a given material and for either indicating this percentage or controlling an apparatus in accordance with departures from a reference percentage.

When it is desired to measure the moisture contained in textile material or the like, it is necessary to resort to various instruments operating through a measure of resistances or else of the variations in dielectric constants or again of static electricity. These hand-operated measuring instruments are generally intended for the checking of mere samples.

It has also been proposed to produce instruments for the continuous checking or the automatic control of certain machines, but as soon as it is desired to check continuously the operation of a machine, such as a gluing machine or a drying machine of any type whatever or automatically to control if possible said operation, the basic problem of measuring the hygrometric state of the material undergoing treatment changes completely. Consequently, in those cases where the systems resorted to do not take into account the thermal inertia or the like features of the machine to be checked or controlled, said machine is caused to operate in accordance with a sinusoidal law of variation due to hunting on either side of a desired reference, and the practical result is complete failure.

It should not be forgotten that, in such a case, a direct and continuous action depending on the variations recorded by the measuring section of said machines, cannot be substituted for the manual action of a thinking human being. Furthermore, although the best results have been obtained in practice by instruments operating through measures of ohmic resistances with a view to measuring, in spite of enormous difficulties, ohmic values that are sometimes considerable and of a magnitude of several millions of megohms for certain percentages of moistures, whereas for other percentages of moisture in similar material, the resistance is equal to only a few megohms, nevertheless such instruments require perfect insulation for the detecting means, together with the use of high-grade material and cables.

Other instruments which operate as capacity meters, are based on the principle of the measure of modifications of the dielectric constant and show the drawback of requiring before operation a gauging for zero moisture, i. e. it is necessary to first dry completely the material to be checked and to gauge the whole system at said so-called zero value, before beginning the actual checking of the material to be tested. The least error in this zero gauging operation may lead to a faulty measuring, which leads in its turn to detrimental consequences.

Furthermore, it is quite impossible in practice to begin this gauging at zero value, each time the machine to be controlled has stopped for some time.

The instruments operating on the principle of the exclusive measure of the static electricity contained in the material to be tested, are submitted to external influences to an extent such that they produce in practice, erroneous and unreliable measures so much so that, within the scope of the present disclosure, I wish merely to mention these instruments for sake of completeness.

Finally, all the instruments executed in accordance with any of the above described prior systems must be provided with electromagnetic or electronic voltage-stabilizing means, which requires the use of a large number of electronic tubes or the like intricate arrangements and constitutes unavoidably a further source of mistakes and failure. When adjusting such instruments for the special thermal and mechanical conditions governing the machines to be controlled, it is furthermore necessary to provide them with intricate arrangements of mechanical impulse-operated control means, which makes the whole machine extremely complicated.

My invention has for its object to remove the above-mentioned drawbacks of the different types of prior instruments by means of an instrument the operation of which relies on the following principle: the ohmic resistances are measured only in that section of the scale of hygrometric states of the material to be checked, for which the measure of ohmic resistances provides the most accurate results, i. e. in the section corresponding to average percentages of moisture, whereas in the lower section of the hygrometric scale, the presence of static electricity is resorted to as a measuring and controlling parameter and in the upper section of the scale corresponding to large percentages of moisture, the measuring and controlling means used are governed by the influence of the modifications in the dielectric constant, whereby a predetermined phenomenon acts automatically as a correcting means according to the degree of moisture to be considered and the influence of said phenomenon predominates over the two other phenomena in the measuring operations.

My improved instrument which requires no complicated detecting means and no brittle parts such as the usual rectifying tubes, is highly reliable in operation so that it may form an intrument capable of actually satisfying all practical requirements.

In the case of the control of a machine, it allows furthermore obtaining control pulses that have been previously adjusted for a predetermined degree of moisture together with an automatic modification of said pulses in accordance with any modification in the degree of moisture with reference to that which has been previously defined, each time there is a modification in the operative conditions of the controlled machines.

My invention has also for its object a simplified control system for the frequency of the accelerating and decelerating pulses together with an adjustment of the duration of the accelerating pulses, whereby it is possible to obtain a delay in the starting of the moisture-controlled machine.

By way of example, I have illustrated diagrammatically in accompanying drawings one of the many possible embodiments of my improved instrument.

Figure 1B:
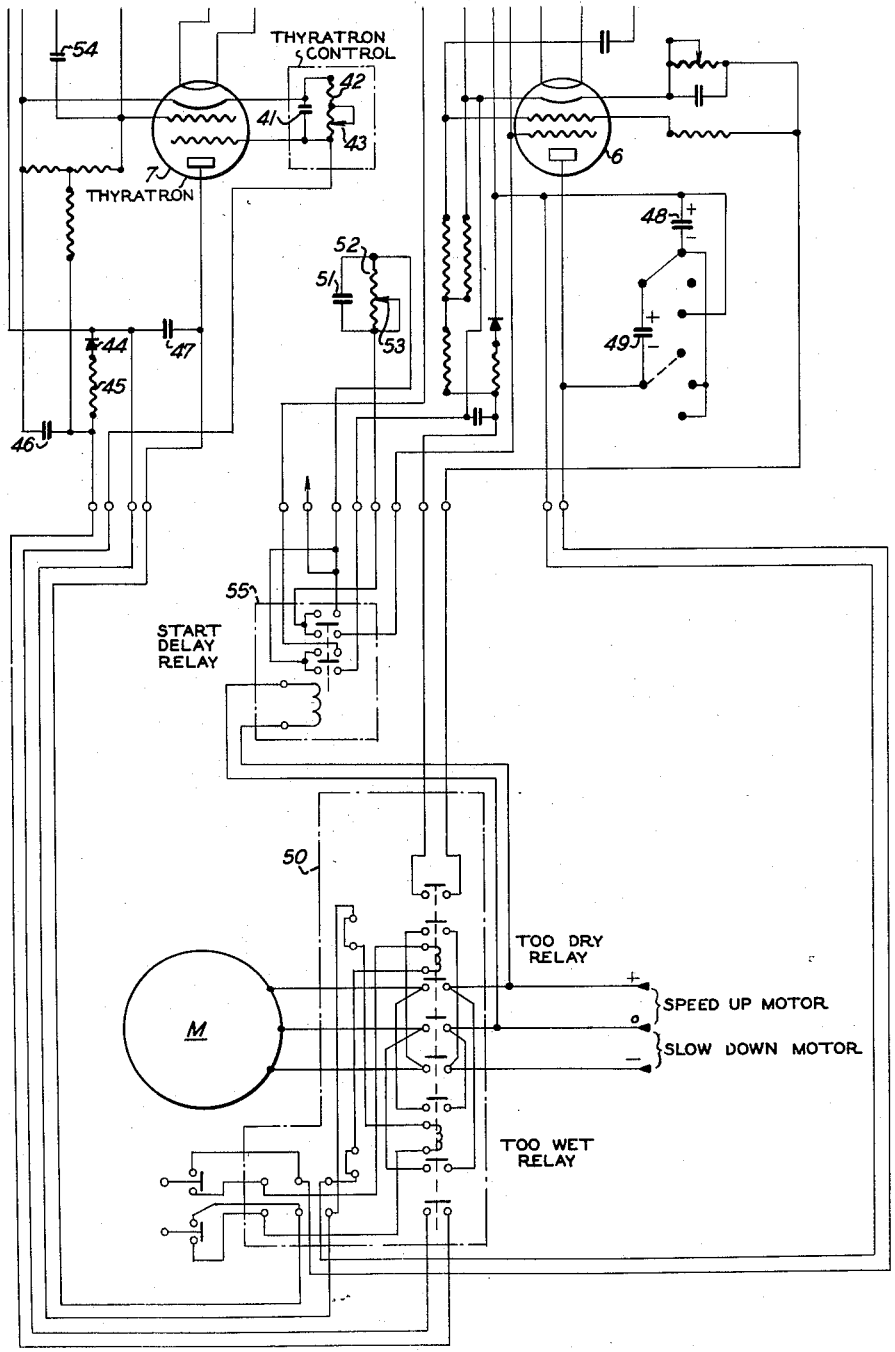

Figs. 1a and 1b form together a wiring diagram of the instrument, the two figures being assumed to form continuations of each other to either side of the line X—Y.

The instrument is fed with single-phase current through a transformer 2, the secondary of which includes windings for the heating of the electronic tubes 3, 4, 5, 6 and 7. The dry rectifier 8, the induction coil 9 and the condenser 10 feed the measuring tube 3 with rectified current. The potentiometric means 12—13 feed the control grid 3a of the tube 3 with a negative bias in the absence of any incoming signal from the feeler electrodes 17, said bias being applied through the circuit formed by the condenser 14 and the resistance 15. The rectification at 8 and the filtering in the induction coil 9 and the condenser 10 leave a sinusoidal component in the current fed to the control grid 3a of the tube 3 through the feeler electrodes 17. This sinusoidal component which has the properties of an alternating current may pass through the condenser formed by the material-feeling electrodes 17 and through the dielectric constituted by the material to be measured between the latter. The tube 3 forms thus a detector and the variations of the anode current correspond to the modifications in the electric properties of the material that is being examined.

The screen grid 3b of the tube 3 receives its voltage from the potentiometric means 16—18, while the tube 19 is inserted so as to provide for stability of the voltage thus fed to the screen grid 3b and also to the anode 3c and cathode 3d of the tube 3 as also for stability of the biasing voltage fed to the thyratrons 4 and 5.

The cathodic voltage of the tube 3 is fed to the cathode 3d by the potentiometer 21—22 while the anode 3c of said tube 3 is fed by the potentiometric element 21 through the loading resistance 23 and the measuring instrument 24 constituted by a galvanometer.

The condensers 25—26 and 27 provide the galvanometer with the desired damping.

The material to be checked is positioned between the feeler electrodes 17 which provide the contact necessary for obtaining the measurement and which also constitute a condenser the latter function being performed only when the machine is running.

The measurement M to be obtained, representing the percentage of moisture in the material, is given by the voltage at the control grid 3a of the tube 3, equivalent to the voltage drop across the terminals of resistance 15.

For low moisture values, there is static charge in the material to be checked, which predominates over all other measurements. For medium values, the resistance of the material predominates, namely the voltage drop across resistance 15, while for high values, at which the static charge and resistance decrease, the dielectric constant is predominant.

The electrical zero of the indicator instrument 24 inserted in the anode circuit is preset so that the zero moisture point corresponds therewith. This is obtained by correct adjustment of the control grid voltage.

The condenser 10, from which the measuring voltage is derived, is so dimensioned that this measuring voltage has a predetermined wave form enabling a predetermined proportion of this voltage to flow through condenser 14. When the machine is running, the transitional resistance across the feeler electrodes and through the material to be checked will vary, thereby causing a signal of different frequency to be superimposed upon or to modulate the measuring voltage. This superimposed or modulating signal also passes through condenser 14 which acts as a parallel resistance relatively to resistance 15, thereby automatically decreasing the resistance value of the latter.

The material to be measured, the resistance 15 and the condenser 14 constitute a kind of voltage divider the midpoint of which is the control grid 3a of tube 3. This voltage divider is supplied with current from resistance 18 and potentiometer 13, while control grid 3a of tube 3 is negatively biased by potentiometer 13. The effect of the material to be checked is to render the grid control voltage more positive or more negative according to whether the negative static charge or the positive voltage drop due to the resistance of the material or its dielectric constant varies.

For low moisture values, the static charge determined thereby will cause a more negative control grid voltage correspondingly to the value of that charge. It is thus possible to effect measurements of moisture values which fall outside of the ranges where pure resistance measurements can be made by measuring the voltage drop across resistance 15. Accordingly, for low moisture values the voltage at grid 3a is automatically the sum of the resistance measurement and of the static charge.

For medium values, the voltage at grid 3a is determined primarily by the voltage drop across resistance 15, whereas any residual static charge and incipient increased dielectric constant will influence the capacitance between the feeler electrodes 17, the effect of which is to cause condenser 14 to function as a resistance in parallel with resistance 15. In this range of moistures, the voltage at grid 3a becomes automatically the product of voltage drops across resistance 15 and condenser 14 corrected by residual static charge.

For high values, at which there is no longer any static charge and the capacitive resistance between the feeler electrodes decreases, whereby increasing proportions of the current flow through condenser 14, the aggregate resistance of resistance 15 and condenser 14 will decrease, whereby the voltage drop across resistance 15 is automatically corrected, the voltage at grid 3a being then the product of the voltage drops across resistance 15 and condenser 14.

One of the feeler electrodes 17 connected with the high voltage terminal is grounded directly and consequently it is possible to use as an electrode any metal part of the machine to be controlled and to cut out any intricate feeling means. This allows also protecting completely the measuring instrument against all the influences appearing generally as a result of a defective insulation, capacity or the like effects inside the actual machine or in the cables feeding it.

Since the high voltage terminal is grounded through the body of the instrument, the length of the connecting cables connecting the body of the instrument and the feelers with the high voltage protected by the resistance 28, on the one hand, and with the grid of the tube 3, on the other hand, cannot, whatever may be the said length, have a detrimental action on the sensitivity or on the accuracy of the measurement.

The thyratron 4, the grid of which is controlled by the modifications in the voltage acting on the galvanometer 24, has its cathode potential defined by the resistance 33 forming part of the compound potentiometer 30—31—32—33—34—35 associated with the filtering condenser 38. The resistances 36, 37 provide for the decoupling of the different electrodes.

The thyratron 5, the grid of which has its potential fed by the resistance 32 of the above mentioned compound potentiometer through a decoupling resistance, has its cathode controlled by the modifications in the voltage fed by the galvanometer 24.

Now, if I define on the galvanometer 24 an operating point corresponding to a predetermined moisture degree, the thyratron 4 and the different parts associated therewith form a relay defining a minimum while the thyratron 5 forms a relay for maximum.

The operation of the thyratrons produces the illumination of the corresponding bulbs, respectively 39 when the material is to dry, and 40 when it is too wet; said bulbs form witness lamps defining the actual moisture with reference to a selected reference moisture. The associated potentiometer elements 30 and 35 allow defining this reference moisture. The potentiometer elements 32 and 33 allow modifying the extent of the range of allowed modifications in moisture.

The system which has just been described forms the checking and measuring section of the instrument according to the invention. The machine controlling section will now be described.

The thyratron 7 is adapted to produce slowing down pulses to be fed to a servo-motor 50 controlling a variable speed system including a motor M, and an electronic, mechanical or the like speed-modifying means of conventional design coupled to the motor M.

This thyratron 7 operates as follows for controlling the operation of the machine: voltage is tapped off across the terminals of the resistance 29 inserted in the cathode circuit of the thyratron 5 and is fed to a point in the circuit between the cathode and the grid of the thyratron 7 through the condenser 54. Consequently, when the thyratron 5 is operative, the thyratron 7 begins also being operative and its anode current produces pulses that may be used for controlling purposes, more particularly to the "Too Wet Relay" of the servo-motor 50.

The circuit 41—42—43 inserted between the cathode and the screen grid of the thyratron 7 is loaded through the dry rectifier system 44—45—46. The screen grid of the thyratron 7 which is biased to a highly negative potential would lock the tube against operation. The potential across the terminals of the condenser 41 increases until the voltage allowing operation of the thyratron is reached. At this moment, a pulse is sent into the servo-motor 50 and at the same time, said condenser 41 is discharged. The screen grid returns to its highly negative voltage and locks again the thyratron 7 against operation and the cycle is repeated in the manner described.

The frequency of the pulses is adjusted by the potentiometric means 42—43 and their duration is defined by the condenser 47.

The thyratron 6 which produces the accelerating pulses operates similarly to the thyratron 7 with the following differences:

The duration of the pulses is adjustable by reason of the possibility of resorting to the condensers 48 and 49 either separately or in series or in parallel connection.

A delay in the operation of the thyratron 6 is obtained after each stoppage of the controlled machine by the following means: a circuit 51, 52, 53 is inserted between the minus terminal and high voltage. When the controlled machine is started operating again, the relay 55 connects the circuit 51, 52, 53 so as to insert it between the cathode and the screen grid of the thyratron 6 so as to lock the latter against operation until the condenser 51 is discharged; the potentiometric resistance 53 allows adjusting the duration of such a delay in the operation of the thyratron. The pulses produced by the anode current of thyratron 6 are fed, for example, to the "Too Dry Relay" of servo-motor 50.

What I claim is:

In a control circuit of a drying machine for the drying of moist material, the combination of a power supply including a transformer having a primary and a secondary, a rectifier fed by the secondary of said transformer, a vacuum tube including a control grid, a pair of feeler electrodes between which the material to be dried is adapted to progress, a connection from one of said electrodes to said rectifier, an auxiliary circuit comprising a resistance and a condenser in parallel connected via said feeler electrodes to said power supply and to the control grid of said vacuum tube, means for adjusting the biasing voltage of said vacuum tube, a moisture indicator fed by said vacuum tube and adapted to indicate the moisture contents for the medial section of the hygrometric scale measured in values of ohmic resistances of the material, for the lower section of said scale in values of static electricity in said material, and in the upper section of the scale in values of the dielectric constant of said material, two thyratron systems fed by the moisture indicator and adapted to produce, respectively when the moisture rises above the maximum and drops underneath the minimum of the range inside which the moisture is allowed to vary, pulses in the control circuit acting on the machine to return the moisture contents into the said allowed range, witness lamps controlled by the thyratron systems, a circuit including a potentiometer, a resistance and a condenser operatively connected to adjust the frequency of the pulses produced by the first thyratron systems to modify the speed of operation of the machine in one direction, a further circuit including a resistance, a potentiometer and a condenser adapted to adjust the frequency of the pulses produced by the second thyratron system to modify the speed of operation of the machine in the opposite direction, two condensers and switches associated therewith and operatively connected to adjust the duration of the pulses produced by the second thyratron system, another circuit including a resistance, a potentiometer and a condenser and operatively connected to act as an adjustable delaying means controlling the second thyratron system to automatically delay the starting thereof after each stoppage of the machine, said delay depending on the type of the machine and material dried thereby and a relay controlled by the operation of the machine and controlling the connection of the second thyratron system with last mentioned delaying means.

References Cited in the file of this patent

UNITED STATES PATENTS

| | | |
|---|---|---|
| 2,244,722 | Norcross | June 10, 1941 |
| 2,346,437 | Krogh | Apr. 11, 1944 |
| 2,532,010 | Courvoisier | Nov. 28, 1950 |
| 2,535,027 | Anderson | Dec. 26, 1950 |
| 2,594,428 | Hall | Apr. 29, 1952 |